United States Patent
Kucernak et al.

(10) Patent No.: US 12,191,545 B2
(45) Date of Patent: Jan. 7, 2025

(54) REDOX FLOW CELL

(71) Applicant: IP2IPO Innovations Limited, London (GB)

(72) Inventors: Anthony Kucernak, London (GB); Javier Rubio-Garcia, London (GB)

(73) Assignee: IP2IPO Innovations Limited, London (GB)

( * ) Notice: Subject to any disclaimer, the term of this patent is extended or adjusted under 35 U.S.C. 154(b) by 116 days.

(21) Appl. No.: 17/434,608

(22) PCT Filed: Feb. 27, 2020

(86) PCT No.: PCT/EP2020/055187
§ 371 (c)(1),
(2) Date: Aug. 27, 2021

(87) PCT Pub. No.: WO2020/174062
PCT Pub. Date: Sep. 3, 2020

(65) Prior Publication Data
US 2022/0173422 A1     Jun. 2, 2022

(30) Foreign Application Priority Data
Feb. 28, 2019   (GB) ..................... 1902695

(51) Int. Cl.
*H01M 8/0656* (2016.01)
*H01M 8/06* (2016.01)
*H01M 8/18* (2006.01)

(52) U.S. Cl.
CPC ......... *H01M 8/188* (2013.01); *H01M 8/0656* (2013.01); *H01M 8/0693* (2013.01); *H01M 2300/0068* (2013.01)

(58) Field of Classification Search
CPC .. H01M 8/188; H01M 8/0656; H01M 8/0693; H01M 2300/0068
See application file for complete search history.

(56) References Cited

U.S. PATENT DOCUMENTS

2014/0370405 A1   12/2014   Zhang et al.
2015/0243991 A1   8/2015   Huskinson et al.
(Continued)

FOREIGN PATENT DOCUMENTS

| CN | 102035007 | 4/2011 |
| CN | 106654331 | 5/2017 |

(Continued)

OTHER PUBLICATIONS

Combined Search and Examination Report for UK Application No. GB1902695.4, mailed Sep. 12, 2019.
(Continued)

*Primary Examiner* — James Lee
(74) *Attorney, Agent, or Firm* — Andrus Intellectual Property Law, LLP (57) ABSTRACT

A method of operating a flow cell. The method comprises providing a flow cell suitable for generating electrical power from hydrogen and a metal electrolyte. Said flow cell comprises a precipitate of metal oxi and said metal oxide comprises vanadium or manganese. The method further comprises electrochemically generating a redox active precipitate removal species from a precursor species, wherein said redox active precipitate removal species is capable of converting said metal oxide. The method further comprises exposing said metal oxide to said redox active precipitate removal species to effect conversion of the metal oxide.

15 Claims, 4 Drawing Sheets

(56) References Cited

U.S. PATENT DOCUMENTS

| | | | |
|---|---|---|---|
| 2015/0263371 | A1 | 9/2015 | Stahl et al. |
| 2016/0043423 | A1 | 2/2016 | Huskinson et al. |
| 2017/0187060 | A1 | 6/2017 | Narayan et al. |
| 2018/0053957 | A1* | 2/2018 | Pez .................... C01B 3/22 |
| 2018/0097249 | A1 | 4/2018 | Narayan et al. |
| 2018/0190991 | A1 | 7/2018 | Hanafusa et al. |
| 2018/0241065 | A1 | 8/2018 | Schubert et al. |
| 2018/0269513 | A1 | 9/2018 | Kaku et al. |
| 2018/0269516 | A1* | 9/2018 | Wang .................... H01M 8/186 |
| 2018/0366759 | A1 | 12/2018 | Brandon et al. |

FOREIGN PATENT DOCUMENTS

| | | |
|---|---|---|
| CN | 106654333 | 5/2017 |
| CN | 108475802 A | 8/2018 |
| EP | 3240084 | 11/2017 |
| EP | 3322011 | 5/2018 |
| JP | 2018537838 A | 12/2018 |
| WO | 2013104664 | 7/2013 |
| WO | 2015019973 A1 | 2/2015 |
| WO | 2015048550 | 4/2015 |
| WO | 2015148357 | 10/2015 |
| WO | 2017067992 | 4/2017 |
| WO | 2017103578 | 6/2017 |
| WO | 2017124112 | 7/2017 |
| WO | 2018146342 | 8/2018 |

OTHER PUBLICATIONS

International Search Report and Written Opinion for PCT Application No. PCT/EP2020/055187, mailed May 8, 2020.

Liang et al., "Carbon-Based Electrochemical Oxygen Reduction and Hydrogen Evoluation Catalysts", Carbon-Based Metal-Free Catalysts: Design and Applications, First Edition, 2018 WileyVCH Verlag GmbH & Co. KGaA, pp. 403-455.

Office Action for Chinese Patent Application No. 2020800322117, issued May 31, 2023.

Janoschka, Tobias et al. "An Aqueous, Polymer-Based Redox-Flow Battery Using Non-Corrosive, Safe, and Low-Cost Materials", Nature, vol. 527, pp. 78-81, published Oct. 21, 2015, retrieved from file:///tsr-od-cifs-01/3101users$/jillj/Downloads/Janoschka_et_al-2015-Nature.pdf on May 25, 2021.

Wang, Wei et al. "Anthraquinone With Tailored Structure for a Nonaqueous Metal-Organic Redox Flow Battery", Chemical Communications, vol. 48(53), pp. 6669-6671, published May 8, 2012, retrieved from https://www.researchgate.net/publication/225068841_Anthraquinone_with_tailored_structure_for_a_nonaqueous_metal-organic_redox_flow_battery on May 24, 2021.

Dargily, Neethu Christudas et al. "A Rechargeable Hydrogen Battery", The Journal of Physical Chemistry Letters, 2018, vol. 9, pp. 2492-2497. Retrieved via Imperial College of London on Mar. 4, 2019.

Hoober-Burkhardt, Lena et al. "A New Michael-Reaction-Resistant Benzoquinone for Aqueous Organic Redox Flow Batteries", Journal of The Electrochemical Society, vol. 164 (4), pages A600-A607, retrieved from https://iopscience.iop.org/article/10.1149/2.0351704jes/pdf on May 24, 2021.

Likit-Anurak, Kris et al. "The Performance and Efficiency of Organic Electrolyte Redox Flow Battery Prototype", 2nd International Conference on Advances on Clean Energy Research, Energy Procedia, Elsevier, NL, vol. 118, pp. 54-62, published Sep. 11, 2017, retrieved from https://pdf.sciencedirectassets.com/277910/1-s2.0-S1876610217X00143/1-s2.0-S1876610217325389/main.pdf?X-Amz-Security-Token=IQoJb3JpZ2luX2VjEFwaCXVzLWVhc3QtMSJG MEQCIHRbxCzHwRJ7%.

Nawar, Saraf et al. "Benzoquinone-Hydroquinone Couple for Flow Battery", Harvard University, MRS Proceedings 1491, published Jan. 2013, retrieved from https://dash.harvard.edu/bitstream/handle/1/27417435/mja233.pdf?sequence=1&isAllowed=y on May 24, 2021.

Notice of Reasons for Refusal for Japanese Patent Application No. 2021-549307, dated Oct. 17, 2023.

* cited by examiner

REDOX FLOW CELL

CROSS-REFERENCE TO RELATED APPLICATIONS

This application is the U.S. national stage application of International Application PCT/EP2020/055187, filed Feb. 27, 2020, which international application was published on Sep. 3, 2020, as International Publication WO 2020/174062 in the English language. The international application is incorporated herein by reference, in entirety. The international application claims priority to GB Patent Application No. 1902695.4, filed Feb. 28, 2019, which is incorporated herein by reference, in entirety.

TECHNICAL FIELD

The present disclosure relates to redox flow cells. The disclosure relates more particularly, but not necessarily exclusively, to methods of operating redox flow cells to effect removal of precipitate build-up thereon.

BACKGROUND

Redox flow cells, such as redox flow batteries (RFBs), are electrochemical apparatus for power delivery by means of a chemical redox reaction. In the context of an RFB, a chemical redox reaction can typically proceed in one direction in a power delivery mode (e.g. with a redox active species becoming reduced and another redox active species becoming oxidised) and in the opposite direction during an energy storage mode.

In the power delivery mode, redox active species are supplied to electrodes where they react electrochemically to produce electrochemical power. RFBs can adjust their power output to meet fluctuating demand by altering the flow of electrolyte species for reaction. Since the redox active species can be stored separately from the electrode chambers and supplied when required, the generating capacity of this equipment is easily scalable.

A background explanation of the general operation of a redox flow cell can be found in international patent publication WO2013104664, the entire contents of which is incorporated herein in its entirety.

However, side reactions taking place within an RFB can lead to precipitate build-up and, over time, this can impact RFB function. Precipitate build-up becomes particularly problematic as concentration of electrolyte is increased. It is, however, desirable to increase electrolyte concentration to obtain a higher capacity RFB.

It is desirable to provide an improved method of operating a flow cell and/or an improved electrochemical apparatus; and/or to provide an alternative method of operating a flow cell and/or an improved electrochemical apparatus; and/or to obviate or mitigate issues with existing methods of operating a flow cell and/or electrochemical apparatus, whether identified herein or otherwise.

SUMMARY

According to a first aspect of the present disclosure, there is provided a method of operating a flow cell, the method comprising:
provided a flow cell suitable for generating electrical power from hydrogen and a metal electrolyte, wherein said flow cell comprises a precipitate of metal oxide, and wherein said metal oxide comprises vanadium or manganese;
electrochemically generating a redox active precipitate removal species from a precursor species, wherein said redox active precipitate removal species is capable of converting said metal oxide; and
exposing said metal oxide to said redox active precipitate removal species to effect conversion of the metal oxide.

According to a second aspect of the present disclosure, there is provided an electrochemical apparatus comprising a first flow cell and a second flow cell:
wherein the first flow cell comprises:
a reversible hydrogen gas negative electrode, in an negative electrode chamber; and
a reversible liquid positive electrolyte in a positive electrode chamber, the cathode chamber comprising a metal oxide precipitate; and
wherein the second flow cell is configured to generate a redox active precipitate removal species from a precursor species, said second flow cell being in fluid communication with the first flow cell to enable passage of liquid catholyte between the second flow cell and cathode chamber of the first flow cell.

According to a third aspect of the present disclosure, there is provided an electrochemical apparatus comprising a flow cell, the flow cell comprising:
a reversible hydrogen gas anode, in an anolyte chamber; and
a reversible cathode in a catholyte chamber, the catholyte chamber comprising a metal oxide precipitate;
wherein the apparatus is configured to generate a redox active precipitate removal species in the catholyte chamber.

Definitions

In accordance with standard terminology in the field of redox flow batteries, the terms "anode" and "cathode" are defined by the functions of the electrodes in the power delivery mode. To avoid confusion, the same terms are maintained herein to denote the same electrodes whether in a power deliver mode of operation or an energy storage mode of operation.

The terms "anolyte" and "catholyte" are used to denote the electrolyte in contact with the "anode" and "cathode".

A flow cell as described herein may be a redox flow battery. A redox flow battery comprises an electrochemical cell for the conversion of chemical energy into electricity. A redox flow battery comprises an anode chamber comprising an anode and an anolyte fluid (i.e. a gas or liquid) and a cathode chamber comprising a cathode and a catholyte fluid (i.e. a gas or liquid). A selective membrane is provided between the two chambers and is configured to exchange ions (e.g. protons, particularly in the context of a hydrogen anolyte) between the two chambers. In the present disclosure, the catholyte fluid is a liquid.

The chambers of electrolyte (catholyte and anolyte) fluid may be charged separately with two different power delivery/energy storage species that are each able to undergo reversible reduction-oxidation reactions. This allows the power delivery/energy storage species in one chamber to undergo, for example, an oxidation reaction while the power delivery/energy storage species in the other chamber undergoes a reduction reaction. The redox reactions cause a net flow of electrons between the chambers, thus generating an electrical current.

As used herein, the expression "redox active precipitate removal species is capable of converting said metal oxide" denotes a chemical species that is able to undergo a redox reaction that converts the precipitated metal oxide species into another species which has greater solubility than the metal oxide.

The reaction may be one in which the metal oxide is reduced, and the precipitate removal species is oxidised, with the reduced species generated from the metal oxide being more soluble that the metal oxide. Thus, the redox active precipitate removal species may be capable of reducing said metal oxide. Here, the precipitate removal species and metal oxide behave as a redox couple. The capability of such redox couples to participate in redox chemistry is well understood based on the relative redox potentials of each species, for example with reference to standard electrode potential tables.

The redox reaction may be one that does not cause a net change in the oxidation state of the metal of the metal oxide, but nonetheless is a reaction which generates a soluble metal species. Thus, the redox active precipitate removal species may be capable of converting said metal oxide to a soluble species. By way of example, some metal oxide precipitates are produced by means of a polymerisation reaction, such as:

$$2VO^{2+} + H_2O \rightleftharpoons V_2O_5 + 2H^+$$

Here, $V_2O_5$ is a polymeric species and has poor solubility. The redox active precipitate removal species can participate in this reversible polymerisation reaction to generate more soluble $VO^{2+}$ species.

"Soluble" as used herein may be understood to denote a species which is able to dissolve in a solvent (such as water) to produce a solution having a concentration of at least about 0.1 M. In the context of a vanadium species, "soluble" may be understood to denote a species which is able to dissolve in a solvent to produce a solution having a concentration of at least about 1.5 M. In the context of a manganese species, "soluble" may be understood to denote a species which is able to dissolve in a solvent to produce a solution having a concentration of at least about 3 M, such as at least about 5 M. The gram amount of a species meeting these requirements would depend on the species concerned. "Soluble" as used herein may be understood to denote a species which has a solubility in a solvent of at least about 10 g/l, such as at least about 900 g/L. "Insoluble" as used herein may be understood to denote a species which has a solubility in a solvent of less than about 5 g/l.

DETAILED DESCRIPTION

According to a first aspect of the present disclosure, there is provided a method of operating a flow cell, the method comprising:
  providing a flow cell suitable for generating electrical power from hydrogen and a metal electrolyte, wherein said flow cell comprises a precipitate of metal oxide, and wherein said metal oxide comprises vanadium or manganese;
  electrochemically generating a redox active precipitate removal species from a precursor species, wherein said redox active precipitate removal species is capable of converting said metal oxide; and
  exposing said metal oxide to said redox active precipitate removal species to effect conversion of the metal oxide.

During standard operation of a flow cell, such as a redox flow battery, precipitates can build-up and, over time, impact flow cell functionality. By way of example, in the context of a flow cell employing a manganese electrolyte, $Mn^{3+}$ may be produced during discharge. $Mn^{3+}$ is an active and unstable species and spontaneously disproportionates into $Mn^{2+}$, $MnO_2$, as follows:

$$2Mn^{3+} + 2H_2O \rightleftharpoons Mn^{2+} + MnO_2 + 4H^+$$

The oxide (e.g. $MnO_2$) produced may build up over time, leaving the oxide as a precipitate in the flow cell (such as on an electrode surface, in pores of electrode surface and/or in tubing, such as fluid conduits e.g. liquid conduits) fluidly connecting parts on the flow cell. This reaction is enhanced as temperature increases.

Oxide precipitate species (such as $MnO_2$) may, alternatively or additionally, be produced if the cell is overcharged (e.g. via oxidation of $Mn^{2+}$ in a two-electron process).

Build-up causes numerous issues such as plugging and clogging of the flow of the electrolytes and membrane fouling. Over time, this may lead to a drop in cell capacity. Overall, build-up has a dramatic impact on the cost of the system, efficiency and energy density of the cell, and causes problems for energy storage applications.

Similar issues of precipitate build-up are encountered with vanadium electrolytes. Here, $VO_2^+$ species (i.e. in a (V) oxidation state) may be produced during standard operation of the cell. $VO_2^+$ may polymerize and precipitate as $V_2O_5$. Such precipitation can be particularly prevalent at certain vanadium concentrations and or temperatures, such as above 1.5 M and/or at temperatures around 40° C. or higher. Thus, the methods of the present disclosure may be particularly useful for implementations involving such concentrations and/or temperatures.

The method of the present disclosure may be understood as a cleaning and/or de-scaling method (i.e. a method of removing precipitate build-up). In this method, a redox active precipitate removal species is generated which is then able to electrochemically convert the precipitate into another (soluble) species, thus maintaining a healthy cell stack.

By way of example, in the context of a catholyte comprising manganese and $Ti^{4+}$ species in a sulfuric acid solution, it may be understood that the manganese species behaves as the power delivery/energy storage species, while $Ti^{4+}$ behaves as a precursor species. A cleaning method as disclosed herein is able to electrochemically generate Ti(III) redox active precipitate removal species. For example, $Ti^{3+}$ redox active precipitate removal species may be generated from Ti(IV), as follows:

$$Ti^{(IV)} + e^- \rightleftharpoons Ti^{(III)}$$

$$E_0 < 0.1$$

Precipitate removal may involve reducing the oxide precipitate with a $Ti^{3+}$ redox active precipitate removal species. In the context of a manganese precipitate, $MnO_2$, the precipitate is reduced to $Mn^{2+}$ or $Mn^{3+}$ and Ti is oxidised to a $Ti^{4+}$, such as $TiO_2$, $TiOSO_4$ or $Ti(SO_4)_2$ (preferably soluble species, such as $TiOSO_4$ or $Ti(SO_4)_2$).

Here, it will be appreciated that $Ti^{4+}$ precursor species is regenerated (e.g. as $TiOSO_4$). The re-generated precursor can be re-used through multiple cycles of precipitate removal. Thus, the present method offers a convenient methodology for effecting cleaning/de-scaling with minimal chemical input. In other words, it may not be necessary to repeatedly "top up" the supply of precursor species to effect cleaning/descaling in the methods of the present invention.

Converting may comprise reducing (for example in the context of a precipitate species, such as $MnO_2$, which can be reduced to yield a soluble species).

The metal electrolyte may be a dissolved metal electrolyte.

The method may further comprise an initial power delivery step. For example, when the method employs a hydrogen gas anolyte, a power delivery redox reaction at the anode half-cell may be:

$$H_2 \rightleftharpoons 2H^+ + 2e^-$$

Hydrogen gas for delivery to the anode chamber may be stored externally to the anode chamber in a container, which may be a pressurised gas source vessel. The hydrogen gas may be supplied to the anode chamber by one or more conduits in the power delivery mode and may be carried away from the anode chamber by one or more conduits in the energy storage mode.

The concentration of the power delivery/energy storage species in the catholyte determines the power and energy density of the cell. The concentration of power delivery/energy storage species in the catholyte may be at least about 0.1 M, such as at least about 0.2 M, optionally greater than about 0.5 M, for example greater than about 1 M, optionally greater than about 1.5 M, optionally greater than about 2.0 M, such as greater than about 2.5 M, such as up to about 3.0 M. Higher concentrations of power delivery/energy storage species can cause issues with precipitation in prior art systems. However, it will be appreciated that the methods of the present disclosure permit higher concentrations of power delivery/energy storage species and hence a greater power and energy density of a cell. The maximum practical concentration of the electrochemically active species will generally be governed by its solubility in the electrolyte.

Said electrochemically generating may be conducted for at least about 1 second, such as at least about 5 seconds, such as at least about 30 seconds, optionally at least about 60 seconds. The time required can be calculated from the decrease in battery capacity. This involves calculation based on the charge decrease and corresponding precipitate removal species (such as Ti(III)) produced. For example, in the context of $MnO_2$ precipitate:

Capacity (A×s) = current (A)×time (s)

Capacity cycle 1 − capacity cycle 2 = capacity Loss (As = Coulomb)

Capacity loss (C)/faraday constant (C mol$^{-1}$) = mol. of electron

Mol. $e^-$ ×0.5 mol $MnO_2$ formation= mol. $MnO_2$ produced

In general terms, cycles 1 and 2 may not necessarily be consecutive cycles.

The electrochemically active species present in the cathode half-cell may comprise manganese and/or vanadium, such as $Mn^{3+}$ or $V^{5+}$. The redox reaction at the cathode half-cell may comprise (i) and/or (ii):

$$V^{5+} + e^- \rightleftharpoons V^{4+} \quad \text{(i)}$$

$$Mn^{3+} + e^- \rightleftharpoons Mn^{2+} \quad \text{(ii)}$$

The precursor species may comprise a metal. The metal of the precursor species may be selected from titanium, aluminium, tin and iron, or a combination thereof. Optionally, the precursor species is selected from titanium, aluminium, and iron, or a combination thereof. The precursor species may comprise titanium.

The precursor species may comprise $Ti^{4+}$, $Al^{3+}$, $Sn^{4+}$, $Fe^{3+}$ species and/or mixtures thereof, optionally $Ti^{4+}$, $Sn^{4+}$, $Fe^3$, such as $Ti^{4+}$, optionally $TiO^{2+}$.

The redox active precipitate removal species may comprise a metal selected from $Ti^{3+}$, $Al^{2+}$, $Sn^{2+}$, $Fe^{2+}$ and/or mixtures thereof, optionally $Ti^{3+}$, $Sn^{2+}$, $Fe^{2+}$, such as $Ti^{3+}$.

Such precursor and redox active precipitate removal species have been found to be particularly effective in the methods disclosed herein.

The flow cell optionally comprises a catholyte chamber for said metal electrolyte, wherein said electrochemically generating is conducted in said catholyte chamber. In this way, the precursor species is converted to the redox active precipitate removal species in situ; that is, in the same chamber as the metal electrolyte. Such a configuration provides a compact and efficient design which requires no further modification to existing systems, save to include a catholyte comprising the precursor species. In situ set up also means that the method can be controlled so as to produce an adequate amount of redox active precipitate removal species depending on the extent of precipitate build up in the catholyte chamber.

In-situ generation of Ti(III) may lead to consumption of hydrogen. This may lead to an electrolyte imbalance. The method may further comprise supplying hydrogen during said electrochemically generating. Hydrogen may suitably be generated by water electrolysis. Alternatively or additionally, hydrogen may be supplied using a hydrogen cylinder.

Optionally, said flow cell comprises a catholyte chamber and, prior to the step of electrochemically generating, the method further comprises:

providing depleted metal electrolyte and redox active precipitate removal species to said catholyte chamber; and charging the flow cell, thereby converting the depleted metal electrolyte into charged metal electrolyte and converting the redox active precipitate removal species into said precursor species. In this option, energy input produces $Ti^{3+}$, $O_2$ and hydrogen according to:

Gas side: $H_2O \rightleftharpoons O_2 + 4H^+ + 4e^-$ $E_0 = 1.23$ V

Mn containing side: $Ti^{(IV)} + e^- \rightleftharpoons Ti^{(III)}$ $E_0 = 0.1$ V This provides extra hydrogen that can act as a buffer. Such an option is particularly useful for in situ generation of redox active precipitate removal species.

The gas side reaction may use a metal catalyst, such as an iridium catalyst (e.g. $IrO_2$). The method may operate at a cell voltage of about 1 to 2 V, such as about 1.6-1.7 V.

The method may be one in which:
the flow cell comprises a catholyte chamber for said metal electrolyte,
said electrochemically generating is conducted in an electrochemical cell separate from said catholyte chamber, and
said metal electrolyte is delivered into said separate electrochemical cell. Such a method may ameliorate issues with electrolyte imbalance in the catholyte chamber as discussed above.

Said separate electrochemical cell may comprise an independent hydrogen supply, such as those discussed herein (e.g. hydrogen generated by water electrolysis, independent hydrogen cylinder, etc.). Upon delivery of the metal electrolyte delivered to the separate electrochemical cell, it will be appreciated that the generated redox active precipitate removal species intermixes with the metal electrolyte. The metal electrolyte and redox active precipitate removal species mixture may then be circulated back to the catholyte chamber.

Said electrochemically generating may be conducted below a voltage at which oxidation of the precursor species occurs (i.e. sufficient to effect oxidation of the precursor species). Optionally, electrochemically generating is conducted at a voltage up to about 0.5 V, such as up to about 0.25 V, for instance at a voltage up to about 0.2 V. Said electrochemically generating may be conducted at a voltage up to about 0.1 V.

Optionally, electrochemically generating is conducted at or below a voltage sufficient to effect reduction of the precursor species. For example, said electrochemically generating may be conducted at a voltage above about 0.0 V.

During standard, prior art, operations of flow cells, it is unusual to adopt low voltage operating cycles as this is known to promote cell degradations due to side reactions. The present disclosure is based on the surprising finding that low voltage operation may provide attendant advantages for cell cleaning/de-scaling as disclosed herein.

According to a second aspect of the present disclosure, there is provided an electrochemical apparatus comprising a first flow cell and a second flow cell:
wherein the first flow cell comprises:
a reversible hydrogen gas anode, in an anode chamber; and
a reversible liquid catholyte cathode in a cathode chamber, the cathode chamber comprising a metal oxide precipitate; and
wherein the second flow cell is configured to generate a redox active precipitate removal species from a precursor species, said second flow cell being in fluid communication with the first flow cell to enable passage of liquid catholyte between the second flow cell and cathode chamber of the first flow cell.

The apparatus may comprise conduits configured to enable passage of fluid between the first and second flow cells.

According to a third aspect of the present disclosure, there is provided an electrochemical apparatus comprising a flow cell, the flow cell comprising:
a reversible hydrogen gas anode, in an anolyte chamber; and
a reversible cathode in a catholyte chamber, the catholyte chamber comprising a metal oxide precipitate;
wherein the apparatus is configured to generate a redox active precipitate removal species in the catholyte chamber.

The electrochemical apparatus according may further comprise the redox active precipitate removal species or a precursor species capable of generating the redox active precipitate removal species in the catholyte chamber. The precursor species may be as defined in the first aspect. The redox active precipitate removal species may be as defined in the first aspect.

Optionally, the electrochemical apparatus of the second or third aspect further comprises a precipitate of metal oxide, said metal oxide comprising vanadium or manganese, wherein said redox active precipitate removal species is capable of converting said metal oxide. The metal oxide may be as defined in the first aspect.

The electrochemical apparatus of the second or third aspect is optionally configured to generate a redox active precipitate removal species in a manner as defined in the first aspect, mutatis mutandis.

The electrochemical apparatus of the second or third aspect is optionally configured to generate a redox active precipitate removal species at a voltage defined in the first aspect.

The electrochemical apparatus of the second or third aspect may further comprise a hydrogen delivery source. The hydrogen delivery source optionally comprises an electrochemical cell configured to generate hydrogen by water electrolysis.

The anode may a porous gas electrode and the cathode may be a porous or non-porous electrode. Examples of suitable electrodes are well known in the art. Catalysed porous carbon electrodes are suitable for use in the present disclosure, for example catalysed carbon paper, cloth, felt or composite. The carbon may be graphitic, amorphous, or have glassy structure. The anode may be a catalysed electrode and the cathode may be a non-catalysed electrode.

The cathode does not usually require catalysis. Therefore, having a cell whereby only one of the electrodes is catalysed may allow the production costs of the cell to be significantly reduced; it is possible, but not necessary, to use some non-noble metal catalyst and this would also reduce costs as compared to the use of noble metal catalysts.

The catalyst used in the anode may be of noble metals such as for example platinum, palladium, iridium, ruthenium, rhenium, rhodium, osmium or combinations thereof, including alloys for example a platinum/ruthenium alloy or binary catalyst such as PtCo, PtNi, PtMo etc. or ternary catalyst PtRuMo, PtRuSn, PtRuW etc. or chalcogenides/oxides as RuSe, Pt-MoOx etc. The catalyst may be a carbon-based catalyst, such as a catalyst described in Liang, J; Zheng, Y; Vasileff, A; Qiao, S (2018) 'Carbon-Based Electrochemical Oxygen Reduction and Hydrogen Evolution Catalysts', ISBN: 9783527811458. Some binary/ternary or other than pure precious metal catalysts can be more tolerant to probable catalytic poisoning as results of catholyte species crossover.

It will be appreciated that although the power delivery/energy storage species present in the cathode half-cell is referred to as a free cation e.g. $Mn^{2+}$, it may be present in the catholyte solution as any stable positively charged complex. When the power delivery/energy storage species present in the cathode half-cell is manganese, the liquid catholyte may be prepared using divalent manganese ($MnSO_4$) or divalent manganese carbonate ($MnCO_3$). The electrolytes will generally be aqueous.

The electrochemically active species in the cathode half-cell is present in liquid electrolyte. Acidic electrolytes are well known in the art and any standard acidic electrolytes may be used in accordance with the present disclosure.

Suitable electrolytes include sulphuric acid, which may be an aqueous solution of concentrated sulphuric acid, methanesulfonic acid (MSA) or trifluoromethanesulfonic acid (TFSA), or mixtures thereof, for example sulphuric acid.

Due to the high electrochemical potential of redox couples such as Mn, the use of organic acid electrolyte may be useful in order to minimise oxygen generation during energy storage mode (charging). The use of any other strong acid is not prohibited if the acid can form soluble metal cations but not reduce or oxidise the catholyte.

The membrane separating the anode chamber from the cathode chamber may be a membrane capable of selectively passing protons (hydrogen ions), which means that the membrane may be a proton exchange membrane or a membrane which is permeable to protons. The membrane may be a proton exchange membrane. Proton exchange membranes are well known in the art, for example, the Nafion™ ion exchange membrane produced by DuPont. Although the Nafion™ membrane has good proton conductivity and good chemical stability, it has a number of disadvantages including a high permeability to vanadium cations and high cost. Therefore, the membrane may be one which is substantially impermeable to metal cations, for example vanadium and manganese cations.

BRIEF DESCRIPTION OF FIGURES

The application will now be further described, by way of example only, with reference to the accompanying drawings, in which.

FIGURES AND EXAMPLES

Figure 1:
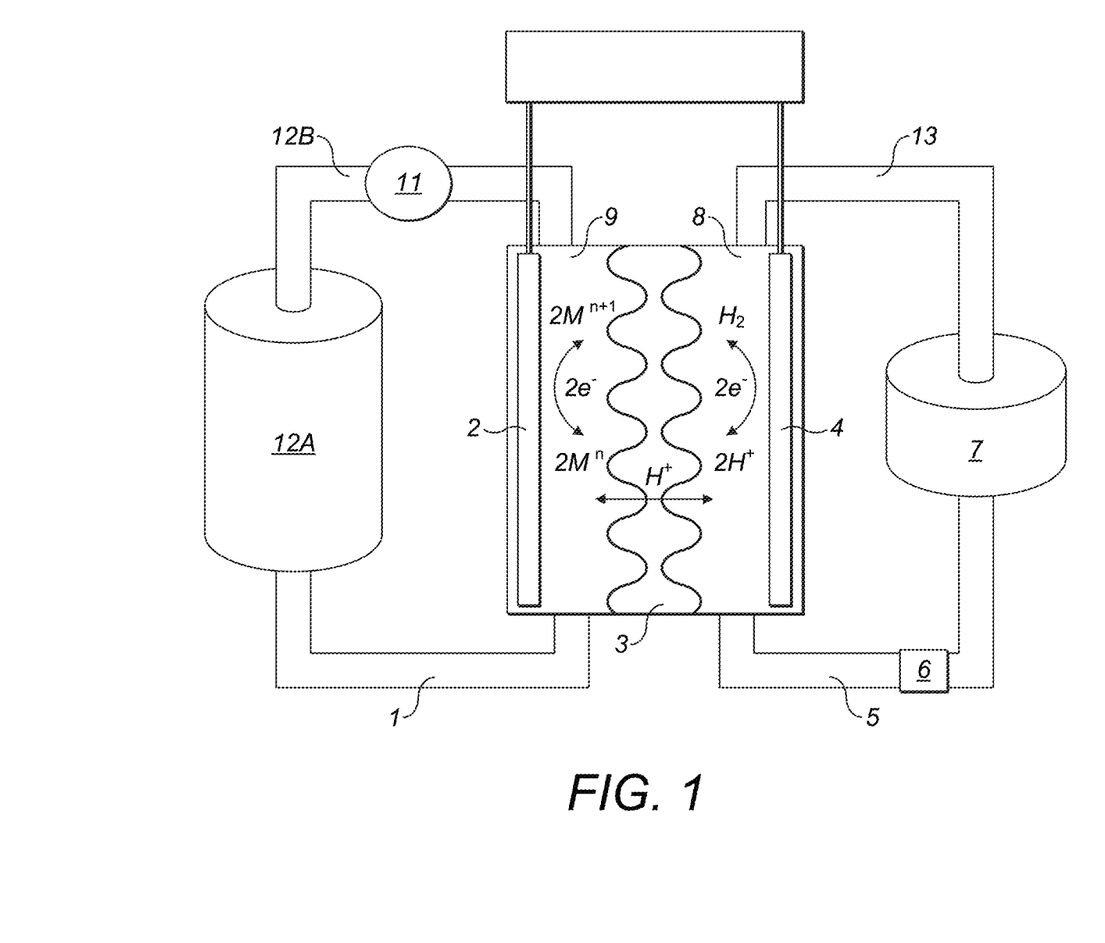
FIG. 1 is a schematic sectional view of a liquid/gas redox flow battery of the disclosure (the terms "liquid" and "gas" denoting the phases of the organic redox active species supplied to the cathode and anode respectively).
Figure 2:
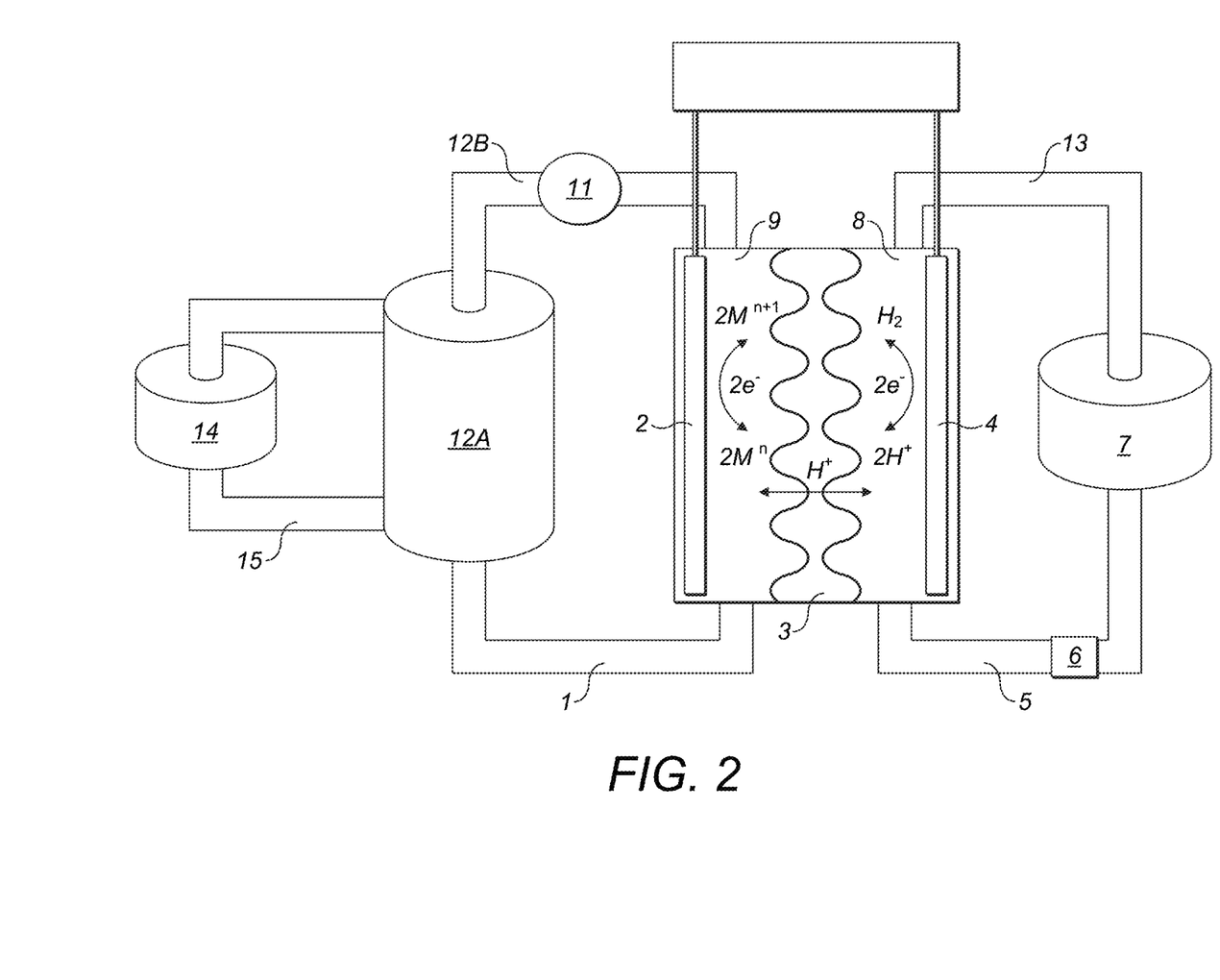
FIG. 2 is a schematic sectional view of a second embodiment of a liquid/gas redox flow battery according to the present disclosure.

FIGS. 1 and 2 depict redox flow batteries according to the present disclosure. The operation of the batteries in both FIGS. 1 and 2 is similar and the same reference numerals are adopted to describe the function of components performing the same function, below. Differences between the function of the two batteries are discussed below.

In the power delivery mode, the liquid catholyte containing a power delivery/energy storage species is pumped by a pump (11) from a chamber of a catholyte storage container (12A), through a conduit (12B) and into the catholyte chamber (9), where it is reduced at a cathode (2) according to the half reaction:

$$Mn^{n+1} + e^- \rightleftharpoons Mn^n$$

The catholyte containing the spent electrolyte species is then carried away from the catholyte chamber through a second conduit (1) to the catholyte storage container (12A), where it is stored in a chamber separate from the fresh catholyte chamber.

The anode and at least part of the anolyte chamber (8) are formed by a porous gas flow electrode (4) and hydrogen is supplied from a pressurised gas source vessel (7) through a conduit (13), to the anode/anode chamber (8), where the hydrogen is oxidised to protons ($H^+$) according to the half reaction:

$$H_2 \rightleftharpoons 2H^+ + 2e^-$$

and the current is collected by a current collector (also labelled 4). A proton exchange membrane (3) separates the anolyte and catholyte chambers (8 & 9) and selectively passes the protons from the anolyte to the catholyte side of the membrane (3) to balance the charge, thereby completing the electrical circuit. Any unreacted hydrogen is carried away from the anolyte chamber (8) by a second conduit (5) and returned to the pressurised gas source vessel (7) via compressor (6).

In the energy storage mode, the system is reversed so that the power delivery/energy storage species $X^n$ is pumped from the catholyte storage container (12A), through the conduit (1) to the catholyte chamber (9), where the spent electrolyte species $X^n$ is oxidised at the cathode (2) to form the redox active species $X^{n+2}$. The resulting regenerated electrolyte is transferred away from the catholyte container (9) by the pump (11), through the second conduit (12B) to the catholyte storage container (12A). Meanwhile, protons at the anolyte side of the proton exchange membrane (3) are catalytically reduced at the porous gas anode (4) to hydrogen gas; the hydrogen is transferred away from the porous anode (4) through the conduit (5) and compressed by the compressor (6) before being stored in the pressurised gas source vessel (7).

It will be appreciated that the above system is illustrated with a power delivery/energy storage species that undergoes a two-electron reduction ($X^{n+2} + 2e^- \rightarrow X^n$). However, the power delivery/energy storage species could be one which undergoes a single-electron reduction). Moreover, although the discussion above is formulated in the context of a manganese power delivery/energy storage species, it will be appreciated that the procedure is analogous for a flow cell employing a vanadium power delivery/energy storage species and electrolyte comprising same.

During power delivery mode, $MnO_2$ builds up over time as described herein. The redox flow battery can then be operated in a precipitate removal mode to remove the oxide build-up.

The RFB fixture is purchased from Scribner Associates. The cell comprises two POCO graphite bipolar plates with a machined flow field in contact with gold-plated copper current collectors that are held together utilizing anodized aluminum end plates. Commercially available 0.32 mm thick untreated carbon paper (SGL group, Germany, Sigracet SGL 10AA, typically 3 layers) or 4.6 mm thick untreated graphite felt (SGL group, Germany, Sigracell GFD4,6 EA) was used as the positive electrode. The hydrogen negative electrode was obtained from Fuel Cell Store, 0.4 mgPt cm−2 loading on Carbon Paper or 0.03 mgPt cm−2 loading on Carbon Cloth). The membrane was Nafion 212 (nominal thickness 52 μm). A peristaltic pump (for example, Masterflex easy-load, Cole-Palmer) and a platinum-cured silicone tubing (L/S 14, 25 ft) (for example, Masterflex platinum-cured silicone tubing) were used to pump the manganese electrolyte through the cell at flow rate of 25-100 mL min−1. Hydrogen was provided by a fuel cell test station (850e, Scribner Associates), passing through the negative side at a flow rate of 35-150 mL min−1. Due to the current range, polarization curves were recorded using a fuel cell test station (850e, Scribner Associates) whereas galvanostatic charge and charge experiments were conducted with a Gamry potentiostat 3000.

In-Situ Generation of Redox Active Species

In the first embodiment shown in FIG. 1, precipitate removal is achieved with generation of redox active precipitate removal species in-situ in the catholyte chamber (9).

This embodiment employs a catholyte comprising manganese and $Ti^{4+}$ species in sulphuric acid solution. The manganese species functions as the power delivery/energy storage species while the titanium species functions as the precursor species for conversion into a redox active species.

The catholyte was prepared by initially adding sulphuric acid to a solution of $Ti(SO_4)_2$ or $TiOSO_4$. A corresponding amount of $MnCO_3$ or $MnSO_4$ was then slowly added. Effervescence of $CO_2$ was observed as a result, facilitating metal solubility.

The catholyte was exposed to a cell voltage between 0 and 0.1 V to effect generation of $Ti^{3+}$ redox active precipitate removal species from the $Ti^{4+}$ precursor species. Reduction of the precursor species was achieved with no power input.

Precipitate removal mode involves reducing the oxide precipitate with the $Ti^{3+}$ redox active precipitate removal species.

The redox active precipitate removal species/oxide precipitate reduction reaction may proceed as follows:

$$2Ti^{(III)} + Mn^{(IV)} \rightleftharpoons 2Ti^{(IV)} + Mn^{(II)}$$

Mn(II), such as $Mn^{2+}$, is soluble in aqueous electrolyte and hence the reduction reaction solubilises the precipitate.

After precipitate removal, the catholyte was exposed to a cell voltage between 0 and 0.1 V again to re-generate $Ti^{3+}$ redox active precipitate removal species for further precipitate removal, as required.

Independent Generation of Redox Active Species

In the second embodiment shown in FIG. 2, the redox flow battery comprises an independent electrochemical stack (14) and conduits (15) fluidly connecting the electrochemical stack (14) to the catholyte chamber (9). The electrochemical stack (14) includes a liquid catholyte chamber with associated cathode and a gaseous (hydrogen) anode chamber and associated anode (not labelled or illustrated). The function of these components is similar to that described above and will not be explained in detail.

The electrochemical stack comprises $Ti^{4+}$ redox active precipitate removal species in the liquid catholyte side thereof. Spent catholyte from the catholyte chamber (9) is pumped to the electrochemical stack (14) and is mixed with the $Ti^{4+}$ species. Energy input to the electrochemical stack (14) produces $Ti^{3+}$ and $O_2$ according to:

$$\text{Gas side: } H_2O \rightleftharpoons O_2 + 4H^+ + 4e^-$$

$$E_0 = 1.23 \text{ V}$$

$$\text{Mn containing side: } Ti^{(IV)} + e^- \rightleftharpoons Ti^{(III)}$$

$$E_0 = 0.1$$

The gas side reaction used an $IrO_2$ metal catalyst and runs at a stack cell voltage of 1.6-1.7 V.

Once produced, the catholyte containing redox active $Ti^{3+}$ species was pumped back to the catholyte chamber (9) and oxide precipitate was reduced to effect removal thereof, in a similar manner to that described in the first embodiment.

Capacity Loss

Figure 3:
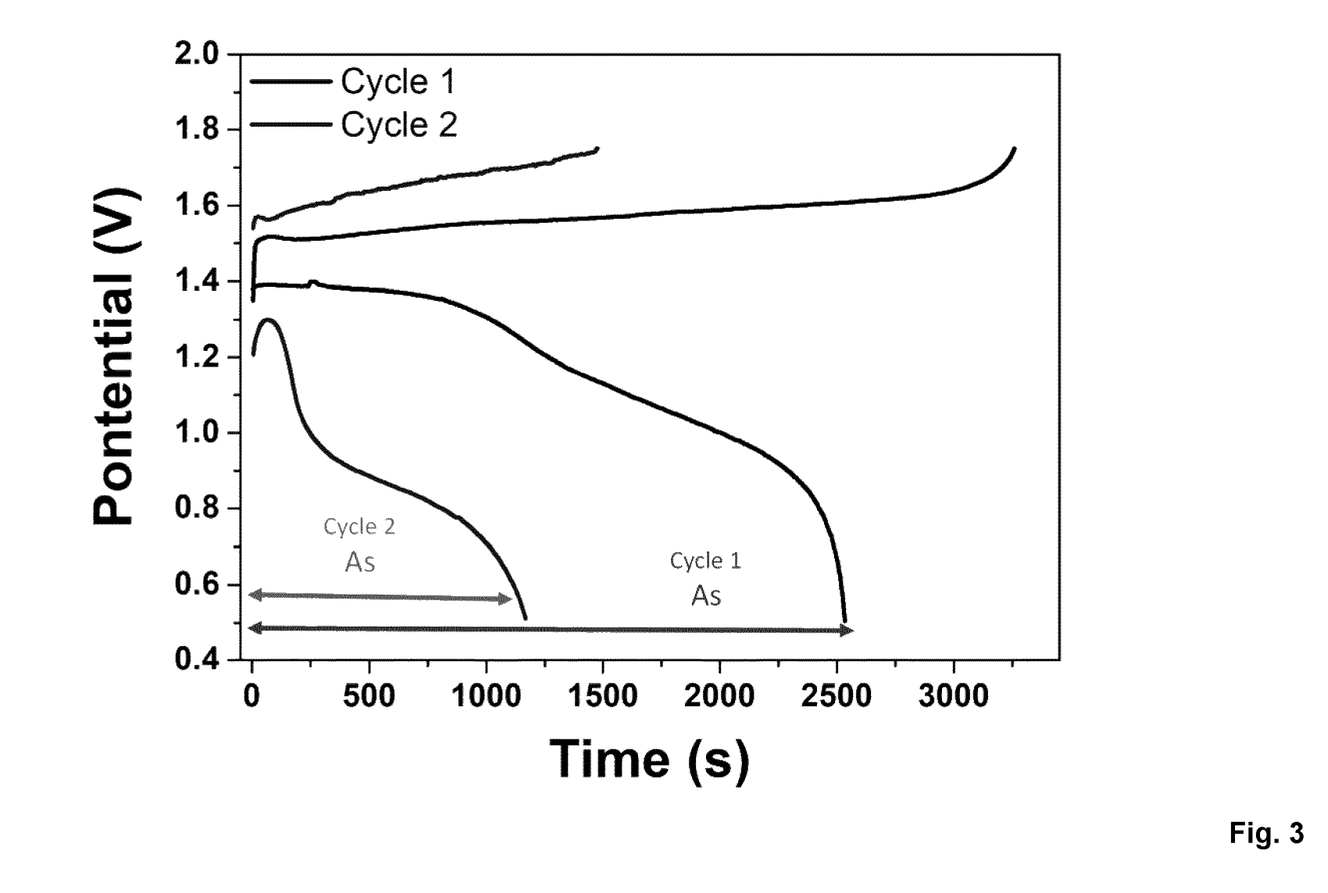
FIG. 3 is a graph showing voltage against time for two power cycles.

Capacity loss and amount of precipitate (e.g. $MnO_2$) which is produced can be calculated by comparison of discharge time (RFB Capacity) during the first cycle with discharge time of subsequent cycles, as follows (e.g. with reference to FIG. 3):

Capacity (A×s) = current (A)×time (s)

Capacity cycle 1 − capacity cycle 2 = capacity Loss (As = Coulomb)

Capacity loss (C)/faraday constant (C mol$^{-1}$) = mol. of electron

Mol. $e^-$ ×0.5 mol $MnO_2$ formation = mol. $MnO_2$ produced

In general terms, cycles 1 and 2 may not necessarily be consecutive cycles.

Precipitate removal is based on operation of the system below 0.1V until the charge measured (which is associated to Ti(III) production) is equal to the capacity loss calculated above.

Example 1

A 5 cm$^2$ cell, using graphite felt with thickness of 4.6 mm as its liquid electrode, standard hydrogen electrode with Pt loading of 0.4 mg/cm$^2$ and 30% PTFE as gas half-cell, and Nafion 117 as proton exchange membrane was tested initially following the conditions below:

1. Electrolyte with 1M Mn and 1M Ti in 5M $H_2SO_4$ was used.
2. Electrolyte was supplied at 50 ml/min throughout the whole experiment.
3. Hydrogen gas (99.99% purity) was supplied at the rate of 100 ml/min.

Figure 4:
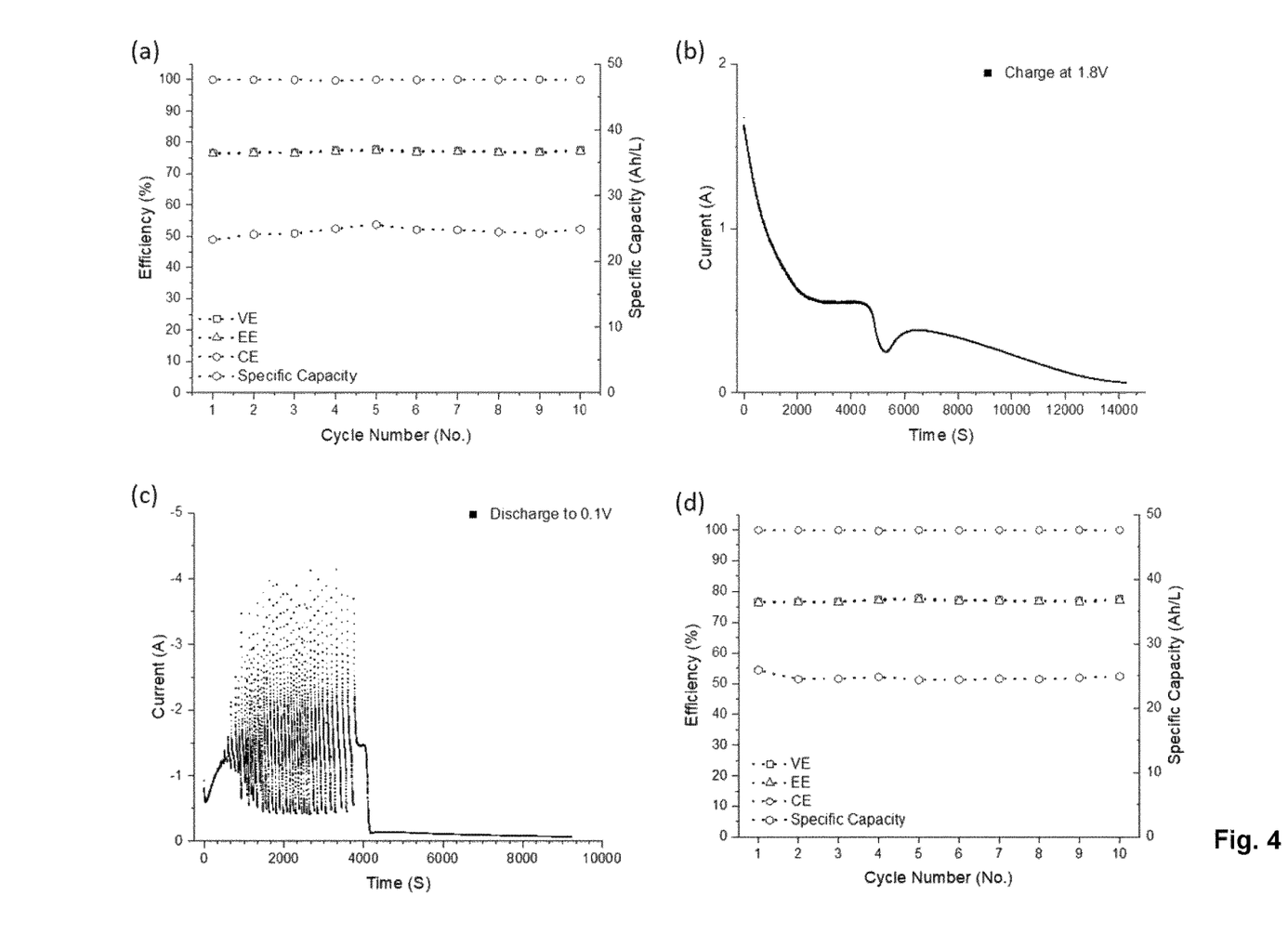
FIG. 4 shows a series of graphs (a)-(d): (a) depicting efficiency performance of a cell over 10 cycles, (b) depicting capacity loss over time with cell overcharging, (c) depicting current changes over time during a step of electrochemically generating a redox active $Ti^{3+}$ precipitate removal species, and (d) depicting efficiency performance of the cell over 10 cycles after precipitate removal.

The protocol was used to carry out the following experiments:

1. The cell was galvanostatic charged and discharged at 100 mA/cm$^2$ for 10 cycles where its performance evaluation indexes (Energy efficiency (EE), Voltage efficiency (VE) and Coulombic efficiency (CE)) was calculated (shown in FIG. 4(a)).
2. The cell was charged at constant voltage of 1.8V until current density dropped to 10 mA/cm$^2$ (shown in FIG. 4(b)).
3. A discharge cycle was attempted at 100 mA/cm$^2$, however the cell immediately reached cut off voltage (0.65) which indicates that all the $Mn^{3+}$ active species have precipitated by producing $MnO_2$ ($Mn^{4+}$).
4. To regenerate the electrolyte and remove the precipitate, $Ti^{4+}$ was reduced to $Ti^{3+}$. In order to achieve this electrochemical reaction, cell was potentiostaticly discharged at constant potential of 0.1V, until the current density dropped to 10 mA/cm$^2$ (shown in FIG. 4(c)).

5. After regenerating the electrolyte and removing the precipitate, similar testing to step 1 was carried out and results are reported (shown in FIG. 4(d)).

The invention claimed is:

1. A method of operating a flow cell, the method comprising:
providing a flow cell suitable for generating electrical power from hydrogen and a metal electrolyte, wherein said flow cell comprises a precipitate of metal oxide, and wherein said metal oxide comprises vanadium or manganese;
electrochemically generating a redox active precipitate removal species from a precursor species, wherein said redox active precipitate removal species is capable of converting said metal oxide; and
exposing said metal oxide to said redox active precipitate removal species to effect conversion of the metal oxide.

2. The method according to claim 1, wherein the precursor species comprises a metal.

3. The method according to claim 1, wherein the precursor species comprises titanium.

4. The method according to claim 1, wherein said flow cell comprises a catholyte chamber for said metal electrolyte and wherein said electrochemically generating is conducted in said catholyte chamber.

5. The method according to claim 1, wherein:
said flow cell comprises a catholyte chamber for said metal electrolyte,
said electrochemically generating is conducted in an electrochemical cell separate from said catholyte chamber, and
said metal electrolyte is delivered into said separate electrochemical cell.

6. The method according to claim 1, wherein said electrochemically generating is conducted at or below a voltage sufficient to effect reduction of the precursor species.

7. The method according to claim 1, wherein said electrochemically generating is conducted at a voltage above about 0.0 V.

8. The method according to claim 1, wherein said electrochemically generating is conducted below a voltage at which oxidation of the precursor species occurs.

9. The method according to claim 1, wherein said electrochemically generating is conducted at a voltage up to about 0.5 V.

10. The method according to claim 1, wherein said electrochemically generating is conducted at a voltage up to about 0.1 V.

11. The method according to claim 1, further comprising supplying hydrogen during said electrochemically generating.

12. The method according to claim 11, wherein said hydrogen is generated by water electrolysis.

13. The method according to claim 1, wherein said flow cell comprises a catholyte chamber and wherein, prior to the step of electrochemically generating, said method comprises:
providing depleted metal electrolyte and redox active precipitate removal species to said catholyte chamber; and
charging the flow cell, thereby converting the depleted metal electrolyte into charged metal electrolyte and converting the redox active precipitate removal species into said precursor species.

14. The method according to claim 1, wherein the precursor species is $Ti^{4+}$.

15. The method according to claim 1, wherein the redox active precipitate removal species is $Ti^{3+}$.

* * * * *